US008346263B2

(12) United States Patent
Olivier et al.

(10) Patent No.: US 8,346,263 B2
(45) Date of Patent: *Jan. 1, 2013

(54) RADIO INTEROPERABILITY SYSTEM AND METHOD

(75) Inventors: Pierre Olivier, Gatineau (CA); Douglas Gordon Roberts, Richmond (CA)

(73) Assignee: Cassidian Communications, Inc., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/719,654

(22) Filed: Mar. 8, 2010

(65) Prior Publication Data

US 2010/0165924 A1      Jul. 1, 2010

Related U.S. Application Data

(63) Continuation of application No. 11/369,869, filed on Mar. 8, 2006, now Pat. No. 7,676,228.

(60) Provisional application No. 60/717,746, filed on Sep. 19, 2005.

(51) Int. Cl.
*H04W 36/00* (2009.01)

(52) U.S. Cl. ........ 455/439; 455/415; 455/518; 379/204; 379/158; 379/202.01; 370/389; 370/465; 370/390; 370/392; 370/401; 370/260

(58) Field of Classification Search ............ 370/474, 370/331, 392, 312, 335, 401, 310, 235, 389, 370/465, 390, 260; 709/245; 455/558, 439, 455/415, 518; 379/204, 158, 202.01
See application file for complete search history.

(56) References Cited

U.S. PATENT DOCUMENTS

| | | |
|---|---|---|
| 3,881,060 A | 4/1975 | Connell et al. |
| 4,029,901 A | 6/1977 | Campbell |
| 4,677,656 A | 6/1987 | Burke et al. |
| 4,893,325 A | 1/1990 | Pankonen et al. |
| 5,206,903 A | 4/1993 | Kohler et al. |
| 5,239,570 A | 8/1993 | Koster et al. |
| 5,311,569 A | 5/1994 | Brozovich et al. |
| 5,392,277 A | 2/1995 | Bernstein |
| 5,428,819 A | 6/1995 | Wang et al. |
| 5,479,482 A | 12/1995 | Grimes |

(Continued)

FOREIGN PATENT DOCUMENTS

CA      2306638       4/2000

(Continued)

OTHER PUBLICATIONS

U.S. Appl. No. 60/264,242, filed Jun. 1, 2004, Ryan, et al.

(Continued)

*Primary Examiner* — Joseph Arevalo
(74) *Attorney, Agent, or Firm* — Knobbe Martens Olson & Bear LLP

(57) ABSTRACT

A method, system and memory are provided for enabling interoperability. A communication session between different communication systems, such as radio systems, operating using different protocols is initiated by receiving a scenario identifier from one of the user devices. An interoperability server receives the scenario identifier and accesses interoperability data to obtain the connection information corresponding the scenario matching the scenario identifier. The data includes scenarios for communication sessions and the connections required for each scenario. Once the interoperability server obtains the connection information, the communication session is initiated.

18 Claims, 5 Drawing Sheets

U.S. PATENT DOCUMENTS

| | | | |
|---|---|---|---|
| 5,481,545 | A | 1/1996 | Maedjaja et al. |
| 5,696,809 | A | 12/1997 | Voit |
| 5,841,848 | A | 11/1998 | Dunn |
| 5,844,974 | A | 12/1998 | Ichikawa |
| 5,862,485 | A | 1/1999 | Linneweh, Jr. et al. |
| 5,867,562 | A | 2/1999 | Scherer |
| 5,898,757 | A | 4/1999 | Buhler et al. |
| 5,905,792 | A | 5/1999 | Miloslavsky |
| 5,915,010 | A | 6/1999 | McCalmont |
| 5,937,051 | A | 8/1999 | Hurd et al. |
| 5,937,334 | A | 8/1999 | Peterson et al. |
| 5,937,355 | A | 8/1999 | Joong et al. |
| 5,940,497 | A | 8/1999 | Miloslavsky |
| 5,970,065 | A | 10/1999 | Miloslavsky |
| 5,999,965 | A | 12/1999 | Kelly |
| 6,009,163 | A | 12/1999 | Nabkel et al. |
| 6,067,356 | A | 5/2000 | Lautenschlager et al. |
| 6,075,853 | A | 6/2000 | Boeckman et al. |
| 6,128,481 | A | 10/2000 | Houde et al. |
| 6,175,562 | B1 | 1/2001 | Cave |
| 6,175,563 | B1 | 1/2001 | Miloslavsky |
| 6,175,564 | B1 | 1/2001 | Miloslavsky et al. |
| 6,185,205 | B1 | 2/2001 | Sharrit et al. |
| 6,185,287 | B1 | 2/2001 | Miloslavsky |
| 6,198,920 | B1 | 3/2001 | Doviak et al. |
| 6,233,445 | B1 | 5/2001 | Boltz et al. |
| 6,252,943 | B1 | 6/2001 | Johnson et al. |
| 6,256,489 | B1 | 7/2001 | Lichter et al. |
| 6,289,083 | B1 | 9/2001 | Ray |
| 6,292,542 | B1 | 9/2001 | Bilder |
| 6,324,279 | B1 | 11/2001 | Kalmanek et al. |
| 6,327,342 | B1 | 12/2001 | Mobley et al. |
| 6,330,324 | B1 | 12/2001 | Sabinson et al. |
| 6,332,022 | B1 | 12/2001 | Martinez |
| 6,392,999 | B1 | 5/2002 | Liu et al. |
| 6,453,038 | B1 | 9/2002 | McFarlane et al. |
| 6,563,919 | B1 | 5/2003 | Aravamudhan et al. |
| 6,587,545 | B1 | 7/2003 | Antonucci et al. |
| 6,654,455 | B1 | 11/2003 | Isaka |
| 6,744,858 | B1 | 6/2004 | Ryan et al. |
| 6,744,859 | B1 | 6/2004 | Koepke et al. |
| 6,771,742 | B2 | 8/2004 | McCalmont et al. |
| 6,879,586 | B2 | 4/2005 | Miloslavsky et al. |
| 6,888,803 | B1 | 5/2005 | Gentry et al. |
| 6,963,557 | B2 | 11/2005 | Knox |
| 6,993,118 | B2 | 1/2006 | Antonucci et al. |
| 7,075,915 | B1 | 7/2006 | Gustke |
| 7,080,157 | B2 | 7/2006 | McCanne |
| 7,583,665 | B1* | 9/2009 | Duncan et al. ............. 370/389 |
| 2001/0036176 | A1 | 11/2001 | Girard |
| 2001/0040887 | A1 | 11/2001 | Shtivelman et al. |
| 2001/0043586 | A1 | 11/2001 | Miloslavsky et al. |
| 2002/0001300 | A1 | 1/2002 | Miloslavsky et al. |
| 2002/0068584 | A1 | 6/2002 | Gage et al. |
| 2002/0110104 | A1 | 8/2002 | Sudila et al. |
| 2002/0138446 | A1 | 9/2002 | Antonin et al. |
| 2002/0197977 | A1 | 12/2002 | Brooks |
| 2003/0007469 | A1 | 1/2003 | Daley et al. |
| 2003/0053434 | A1 | 3/2003 | Chow et al. |
| 2003/0058827 | A1 | 3/2003 | Chow et al. |
| 2003/0139174 | A1 | 7/2003 | Rao |
| 2003/0158954 | A1 | 8/2003 | Williams |
| 2003/0179772 | A1 | 9/2003 | Niklasson |
| 2004/0053607 | A1 | 3/2004 | Ronneke |
| 2004/0105529 | A1 | 6/2004 | Salvucci et al. |
| 2004/0184584 | A1 | 9/2004 | McCalmont et al. |
| 2004/0190468 | A1 | 9/2004 | Saijonmaa |
| 2004/0260750 | A1* | 12/2004 | Ruutu et al. ............... 709/200 |
| 2005/0030966 | A1 | 2/2005 | Cai et al. |
| 2005/0090225 | A1 | 4/2005 | Muehleisen et al. |
| 2005/0141689 | A1 | 6/2005 | Wengrovitz |
| 2005/0201358 | A1 | 9/2005 | Nelson et al. |
| 2005/0201359 | A1 | 9/2005 | Nelson et al. |
| 2005/0201527 | A1 | 9/2005 | Meer et al. |
| 2005/0201528 | A1 | 9/2005 | Meer et al. |
| 2005/0201529 | A1 | 9/2005 | Nelson et al. |
| 2006/0083220 | A1 | 4/2006 | Mekala et al. |
| 2006/0120347 | A1 | 6/2006 | Mekala |
| 2006/0176900 | A1* | 8/2006 | Liu et al. .................. 370/465 |
| 2006/0212179 | A1* | 9/2006 | Philips et al. .................. 701/1 |

FOREIGN PATENT DOCUMENTS

| | | |
|---|---|---|
| EP | 1 054 554 | 11/2000 |
| EP | 1 109 417 | 6/2001 |
| EP | 1 453 248 | 9/2004 |
| WO | WO 01/65763 A2 | 9/2001 |
| WO | WO 01/65868 | 9/2001 |
| WO | WO 01/67733 | 9/2001 |
| WO | WO 2005/015804 | 2/2005 |

OTHER PUBLICATIONS

Cisco IP Telephony Network Design Guide, Cisco CallManager Release 3.0. Corporate Headquarters, Cisco Systems, Inc. San Jose, CA. Customer Order No. DOC-7811103; Text Part No. 7811103-01.

Deering, S.; Host Extensions for IP Multicasting; Aug. 1998, pp. 1-15. http://www.ietf.org/rfc/rfc1112.txt.

E9-1-1 Systems—Product Guide, Software Release B:2.1, CML Public Safety Systems, Jul. 1999.

Fenner, W.; Internet Group Management Protocol, Version 2; Nov. 1997; pp. 1-15.

Final Rejection by Examiner dated Aug. 17, 2007 issued in U.S. Appl. No. 11/095,465, filed Apr. 1, 2005.

http://www.vega-signaling.com/RadioDispatch/products.nsf/pages/Product-Type=Portable%20Interoperability.

http://www.zetron.com/pages/english/products/landmob2/html.

IP Products White Paper; Vega Telex Signalling Product Company; Aug. 9, 2002.

NENA Generic Standards for E9-1-1 PSAP Equipment, NENA PSAP Standards Sub-Committee, NENA-04-001, Issue 1, Jun. 20, 1996.

NENA Generic Standards for E9-1-1 PSAP Equipment. NENA Technical Reference. NENA-04-001 Issue 1, Jun. 20, 1996. Prepared by: National Emergency Number Association (NENA) PSAB Standards Sub-Committee. Published by NENA. Printed in U.S.A.

NENA Recommended Generic Standards Dealing with Network Interface for E9-1-1 and Emerging Technologies, NENA PSAP Standards Committee, NENA-03-XXX, Draft Issue 1.06, Sep. 17, 2000.

NENA Recommended Generic Standards Dealing with Network Interface for E9-1-1 and Emerging Technologies. Nena Technical Reference. NENA-03-XXXX Draft Issue 1.01, Jul. 13, 2000.

Generic Standards for E9-1-1 and Emerging Technologies. Prepared by: National Emergency Number Association (NENA) PSAP Standards Sub-Committee. Published by NENA. Printed in U.S.A.

NENA Recommended Generic Standards for E9-1-1 PSAP Equipment, NENA CPE/PSAP Standards Technical Committee, NENA-04-001, Issue 2, Mar. 2001.

NENA Standard, Generic Requirements for an Enhanced 9-1-1 Selective Routing Switch, NENA Network Technical Committee, NENA-03-005, Jan. 2004.

Network Access Radio; Catalyst Communications Technologies, Inc.:: Network Access Radio; pp. 1-3 http://www.catcomtec.com/index2.php?option=com_content&task-view&id=47&Itemid=. . . .

Non-Final Rejection by Examiner dated Feb. 9, 2007 issued in U.S. Appl. No. 11/095,465, filed Apr. 1, 2005.

Non-Final Rejection by Examiner dated Nov. 30, 2007 issued in U.S. Appl. No. 11/095,465, filed Apr. 1, 2005.

$P25^{IP}$ Technical Overview; $P25^{IP}$. Secure and Reliable Digital Voice and Data Communications; Tyco/Electronics.

Panossian et al.: Towards Providing Enhanced 911 Emergency Service in IP Telephony. Department of Computer Networking, University of Missouri—Kansas City. Nov. 1998. Revised: Aug. 1999.

Panossian, Serge G., "A Conceptual Architecture for Enhanced 911 Emergency Service for IP Telephony", Masters Thesis presented to the Faculty of the University of Missouri—Kansas City, Dec. 18, 1997.

Reed, et al.: An Overview of the Challenges and Progress in Meeting the E-911 Requirement for Location Service. IEEE Communications Magazine, Apr. 1998. pp. 30-37.

Schulzrinne: Providing Emergency Call Services for SIP-based Internet Telephony. Internet Engineering Task Force. Columbia U., Internet Draft. Jul. 13, 2000. Expires: Dec. 2000.

Wave (Wide Area Voice Environment); Twisted Pair Solutions.

Popovicl, et al., Consistency Support for a Decentralized Management in Close Multiparty Conferences Using SIP, The 11th IEEE International Conference on Sep. 28-Oct. 1, 2003, Piscataway, NJ, USA, IEEE. pp. 295-300.

Zetron, "Private/Land Mobile Radio," web page including links to products, 2 pgs., web address, printed Feb. 3, 2006.

Vega, "Communications and the Best Practices in Crisis Management," web page, 1 pg., web address, printed Feb. 3, 2006.

Vega, "Viper, Custom Configurations," web page, 1 pg., web address, printed Feb. 3, 2006.

Vega, "Viper Eight, Portable Command Center Network Infrastructure," web page, 1 pg., web address, printed Feb. 3, 2006.

Vega, "Viper MCU, Self-Contained Portable Communications Command Center," web page, 1 pg., web address, printed Feb. 3, 2006.

\* cited by examiner

RADIO INTEROPERABILITY SYSTEM AND METHOD

CROSS-REFERENCE TO RELATED APPLICATIONS

This application is a continuation of U.S. Ser. No. 11/369,869, filed Mar. 8, 2006 and which issued on Mar. 9, 2010 as U.S. Pat. No. 7,676,228, which claims the benefit of U.S. Provisional Application Ser. No. 60/717746, filed Sep. 19, 2005, which are hereby incorporated by reference in their entirety.

BACKGROUND OF THE INVENTION

Field of the Invention

The present invention relates to radio interoperability systems and methods.

Public safety communication systems, such as 911 services, police and firefighter systems, use radio dispatch. Typically, dedicated public safety frequencies are used, which are frequently in the 800 MHz UHF range. However, each agency or agencies from different municipalities use different frequencies.

In the aftermath of the events of Sep. 11, 2001, there is a mandate for there to be interoperability between the communication systems of the various emergency services agencies. In addition to various radio frequencies and different radio signaling protocols, there is a requirement for seamless interconnection of the radio systems with telephone systems and packet network based communication systems, such as VoIP (Voice Over Internet Protocol).

Existing solutions that enable radio interoperability require an operator to manually set up a scenario or session between the user devices that are to be parties to the session.

Examples of current interoperability solutions include Vega®'s V.I.P.E.R system; Zetron's interconnect products; Raytheon JPS Communications' ACU1000™; Catalyst Communication Technology, Inc.'s IP Link™; and Twisted Pair Solution's Wave™. Interoperability is also described in Applicant's co-pending U.S. patent application Ser. No. 11/095,465 filed Apr. 1, 2005 and Ser. No. 11/096,081 filed Apr. 1, 2005, both of which are hereby incorporated by reference in their entirety.

SUMMARY OF THE INVENTION

In one aspect of the present invention, there is provided a method of initiating communication between a plurality of communication systems, at least two of the communication systems using different communication protocols, the method comprising: maintaining interoperability data defining a plurality of scenarios, each scenario defining a mode of interoperability between a respective set of communication systems of the plurality of communication systems, at least one communication system in the respective set being a two-way radio system; receiving a selection of a particular one of the scenarios; in response to receiving the selection, automatically initiating establishment of a communication session between the communication systems of respective set of communication systems of the particular one of the scenarios.

In a second aspect of the present invention, there is provided an interoperability system for enabling interoperability between a plurality of communication systems having at least two different communication protocols and in communication with a packet network, at least one of the communication systems being a two-way radio system, the interoperability system comprising: an interoperability server in communication with the packet network, the interoperability server configured to receive a selection of a particular scenario and initiate establishment of a communication session corresponding to the particular scenario, wherein the particular scenario is selected from interoperability data defining a plurality of scenarios, each scenario comprising a mode of interoperability between a respective selected set of communication systems of the plurality of communication systems.

In a third aspect of the present invention, there is provided a memory for storing data for access by an application program being executed on an interoperability server, comprising: an interoperability data structure stored in said memory, the data structure including information resident in a database used by said application program and including: a plurality of scenario identifier data objects comprising a scenario identifier for each of a plurality of scenarios, each scenario consisting of connections required for a respective communication session between at least two user devices from at least two different communication systems, at least one of the two communication systems being a two-way radio system, and having at least two different communication protocols; a plurality of scenario interconnection data objects, each scenario connection data object comprising connection information for the respective communication session.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying drawings, in which.

DETAILED DESCRIPTION OF THE PREFERRED EMBODIMENTS

Figure 1:
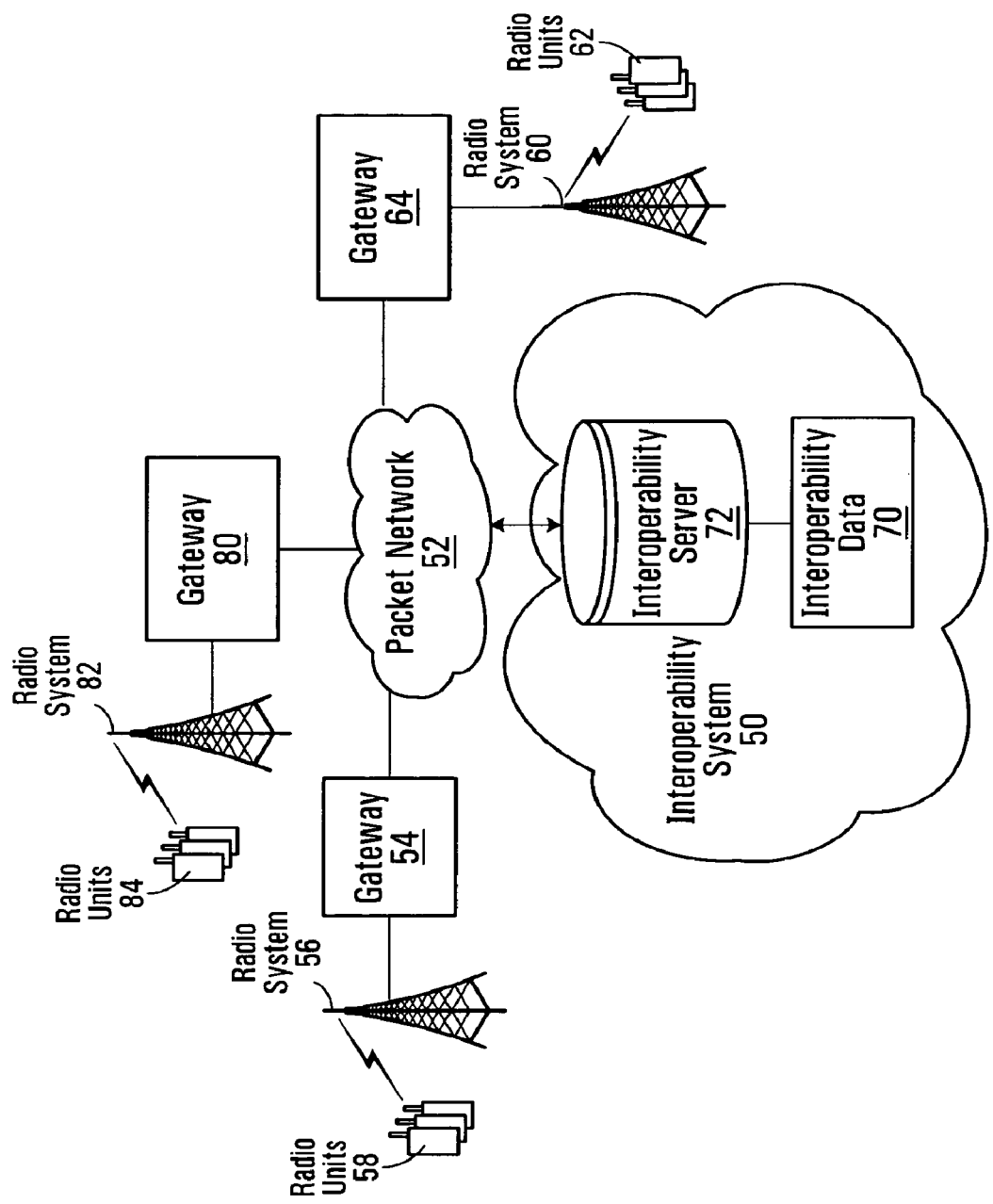
FIG. 1 is a block diagram of an interoperability system according to one embodiment of the present invention.

FIG. 1 is a block diagram of an interoperability system 50 according to one embodiment of the invention for enabling interoperable communications between multiple radio systems 56, 60, 82 (only three shown). Radio systems 56, 60 and 82 operate on different protocols, such as different frequencies and/or signalling protocols. In some embodiments, at least one and preferably all of the radio-systems is a two-way radio system, i.e. a system enabling radio communication service between radio units such as but not limited to mobile and/or land stations. This includes, but is not limited to conventional land, maritime, and aeronautical mobile services, common carriers such as cellular telephone and radio paging, and new applications like PCS (Personal Communications System)and elements of the Intelligent Transportation System (ITS, formerly the Intelligent Vehicle Highway System, or IVHS).

Each radio system 56, 60 and 82 is shown supporting a respective set of radio units 58, 62 and 84. The actual radio units supported can change over time. In each radio system 56, 82 or 60, communication signals are broadcast on one or more channels. Each channel might for example be a respective frequency. Each radio unit 58, 84 or 62 within a respective radio system 56, 82 or 60 can receive all communication signals broadcast over any channel or channels that it is monitoring.

The interoperability system 50 and the radio systems 56, 60, 82 are all in communication with a packet network 52. The packet network 52 can be any network that uses a packet protocol, such as, but not limited to, an IP network, the Internet, a WAN (Wide Area Network) or a LAN (Local Area Network). In some embodiments, the packet network is enabled for multicasting. In some embodiments the interoperability system operates on a QoS-enabled Internet Protocol (IP) backbone.

The interoperability system 50 comprises an interoperability server 72 that has access to interoperability data 70. The interoperability server 72 can be any combination of hardware and/or software designed to implement the functions described herein. The interoperability data 70 is information used to make the connections required to set up communication sessions corresponding to each of a set of scenarios. For the embodiment of FIG. 1, a "scenario" is a pre-defined mode of interoperability that connects a particular set of radio systems together such that radio units on one of the systems can communicate with radio units on another of the systems. In some embodiments, a scenario identifier identifies each scenario. The scenario identifiers identify scenarios for interoperability between various radio systems 56, 60, 82. The interoperability data also includes all of the connection information needed to set up the scenarios. Connections are physical or virtual connections. In some embodiments the interoperability data 70 is in a database. In some embodiments, the interoperability data 70 is located on the interoperability server 72.

In operation the interoperability server 72 receives a selection of a particular scenario from one of the radio systems and initiates the establishment of connections corresponding to the particular scenario based on connection information obtained from the interoperability data 70. This process will be discussed in greater detail below.

In some embodiments the radio systems 56, 60, 82 are dispatch systems, such as emergency dispatch systems used for public safety. Example emergency dispatch systems include fire department dispatch systems, police department dispatch systems, and ambulance dispatch systems. In some embodiments, the radio systems are in different municipalities or regions. Although FIG. 1 has only three radio systems, an interoperability system 50 according to the present invention can support any number of radio systems. In other embodiments, other types of communication systems, such as telephony systems, IP radio systems, IP telephony systems, etc., are supported.

In the illustrated example, radio system 56 supports a plurality of radio units 58 that communicate with each other using the protocol of that radio system. The radio system 56 is in communication with the packet network 52 through a gateway 54 that converts signals from the radio system 56 into the packet protocol and converts signals received from the packet network 52 into audio and signalling in accordance with the protocol of the radio system 56.

Similarly, radio system 60 supports a plurality of radio units 62 that communicate with each other using the protocol of that radio system. The radio system 60 is in communication with the packet network 52 through a gateway 64, which converts signals from the radio system 60 into the packet protocol and converts signals received from the packet network 52 into audio and signalling in accordance with the protocol of the radio system 60.

Radio system 82 supports radio units 84, and is in communication with the packet network 52 through a gateway 80, which performs a function similar to that of the other gateways 54 and 64.

Examples of gateways are described in the Applicant's co-pending application Ser. No. 11/095,465. Gateways allow radio systems having different protocols, such as EIA tone or vendor specific signalling, to be interconnected with the interoperability system 50. In some embodiments,) gateways 54, 64, 80 each has an IP address. In some embodiments the gateways 54, 64, 80 are members of IP multicast groups. A communication can be sent to either of the radio systems 56, 60 or 82 over the packet network 52 by sending the communication to the IP address of the respective gateway 54, 64, or 80.

Scenarios are pre-defined, for example through an administrative interface (not shown) to the interoperability system 50.

For the particular example of FIG. 1, the available interoperability scenarios include system 56+system 60
system 56+system 82
system 60+system 82
system 56+system 60+system 82.

A sub-set or all of these scenarios is configured so as to be made available. The particular scenarios to be made available will of course depend upon the particular manner in which the different radio systems need to inter-operate. The particular nature of the connection information is implementation dependent. Users of the radio units have access to information allowing them to select a particular scenario. This might consist of a menu of scenarios and corresponding scenario identifiers.

Assuming the first three scenarios above are implemented, the interoperability data might take the following form, shown in Table 1 below:

TABLE 1

| Scenario Identifier | Gateway IP Address |
|---|---|
| 150 | IP Address of gateways 54, 64 |
| 151 | IP Address of gateways 54, 80 |
| 152 | IP Address of gateways 64, 80 |

A user in one of the radio systems can initiate a communication session with another radio system by selecting a scenario identifier for a particular scenario. In some embodiments the scenario identifier is sent to the interoperability server 72 using DTMF (Dual Tone Multi-Frequency) technology.

For example, a user might want to implement the scenario connecting gateway 54 to gateway 64. The scenario identifier for this scenario is "150". A user in radio system 56 can initiate the communication session by keying the scenario identifier "150" into his or her radio unit 58. Gateway 54 will convert the signal carrying the scenario identifier into packet protocol and send it to the interoperability system 50. The interoperability server 72 receives the scenario identifier and accesses the interoperability data 70 to obtain the corresponding connection information for the scenario. In this case, the connection data will comprise the IP addresses of gateways 54, 64. Based on the connection information obtained, the interoperability server 72 initiates the establishment of the communication session. In some embodiments, the interoperability server 72 establishes the communication session by signalling the gateways 54 and 64 to communicate with each other. Examples of how sessions are established will be given below. Transmissions from the user on radio unit 58 are then broadcast over radio system 56 in the radio protocol of the radio system 56, converted into packet protocol by gateway 54, and sent to the IP address of gateway 64. Gateway 64 converts the signal from packet protocol into audio and signalling and broadcasts it over radio system 60 in the radio protocol of the radio system 60, where it is received by radio units 62.

How a session is established varies depending on the type of session, for example, half-duplex or full duplex. A session can be full-duplex if all entities within the session support full-duplex operation. Telephone circuits (PSTN or VoIP) typically support full-duplex operation. Radio systems, however, often use a single frequency for receive and transmit audio and therefore support only half-duplex operation, meaning a subscriber can only talk or listen, and not do both at once; speech direction is usually controlled by a push to talk (PTT) switch on each subscriber unit, although it can also operate via voice-operated (VOX) circuitry.

For a full-duplex session, the interoperability server 72 instructs each individual gateway 54, 64 or 80 involved in the session to establish connection with the other gateways involved in the session, as appropriate. Each gateway will then start outputting incoming audio from the radio system 56, 60 or 82 towards the packet network 82, using IP multicasting or a series of IP unicast packets, as appropriate. Each gateway will also start accepting the audio received from the other gateways, received through packet network 52, sum it if appropriate (i.e. if more than 2 entities are involved in the session) and retransmit it towards its respective radio system 56, 60 or 82 as appropriate.

For a half-duplex session, the interoperability server 72 instructs each individual gateway 54, 64 or 80 involved in the session to establish connection with the other gateways involved in the session, as appropriate. Each gateway will then start outputting incoming audio from the radio system 56, 60 or 82 towards the packet network 52, using IP multicasting or a series of IP unicast packets, as appropriate. Each gateway will also output the status of its respective radio system (i.e. whether incoming audio is present or not) to the interoperability server. This status can either be received from a radio as a digital signal or can be deduced from speech analysis by the gateway. The interoperability server 72 arbitrates which entity should be talking using first-come, first-serve or priority algorithms. The interoperability server 72 then sends each gateway a packet containing the identity of the gateway controlling the talking entity. Each gateway uses this information to accept the audio received from the talking gateway, received through packet network 52, and retransmit it towards its respective radio system 56, 60 or 82 as appropriate.

Although the above embodiment only includes one interoperability system 50, multiple interoperability systems 50 and multiple interoperability servers 72 can exist for increased capacity. The interoperability servers 72 can be geographically separated for increased fault tolerance. The interoperability data 70 can be in one location accessible by all interoperability servers or the interoperability data can also be stored in multiple locations.

Furthermore, it is noted that once the definition of scenarios is complete, and a mechanism for selecting a particular scenario is provided, any method can be used to physically implement the scenario.

Figure 2:
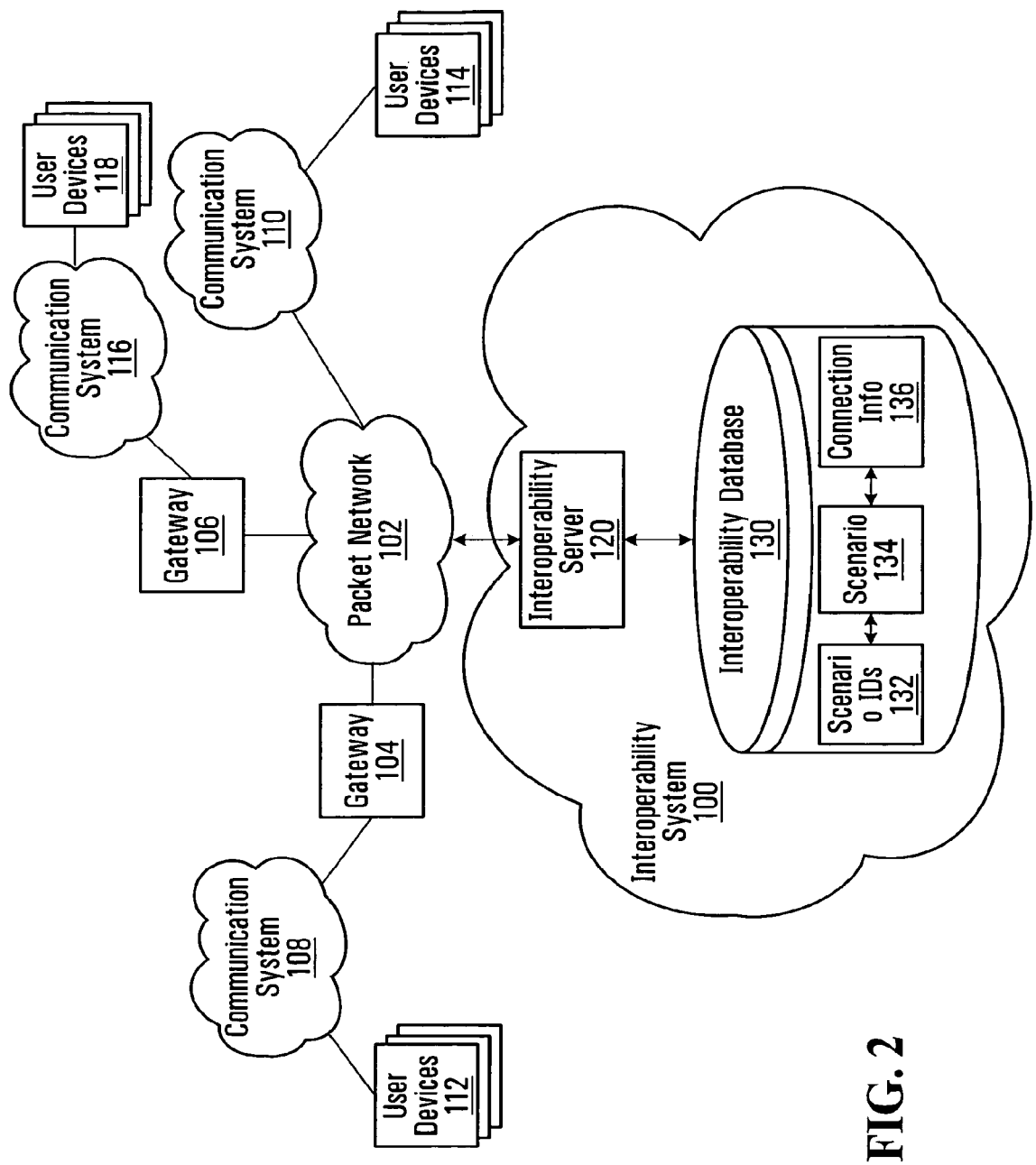
FIG. 2 is a block diagram of an interoperability system according to one embodiment of the present invention.

FIG. 2 is a block diagram of an interoperability system 100 in accordance with one embodiment of the invention. The interoperability system 100 depicted in FIG. 2 is in communication with a packet network 102. Communication systems 108, 110, 116 are also in communication with the packet network 102. In the case of communication systems 108, 116 the connections to the packet network are through gateways 104, 106 which convert the protocol of communication systems 108, 116 into packet protocol and vice versa. Communication system 110 uses packet protocol and therefore a gateway is not required. Communication systems 108, 110, 116 each support a plurality of user devices 112, 114, 118 respectively. It is to be understood that the interoperability system 100, in accordance with the present invention, can support any number of communication systems, gateways and user devices in communication with a packet network 102 and is not limited to three communication systems, as depicted in FIG. 2.

The interoperability system 100 comprises an interoperability server 120 and an interoperability database 130. The interoperability server 120 has access to the interoperability database 130. The interoperability database 130 comprises scenario identifiers 132, scenarios 134 and connection information 136 stored in any appropriate form. The scenario identifiers 132 identify the scenarios 134. The identifiers are preferably a string of digits but can be a string of characters or a combination of digits, characters and symbols. Each scenario 134 is a connection scenario for connecting any of a plurality of user devices from any of a plurality of communication systems 108, 110. For example, one scenario is for user device 112 to connect with user device 114. Another scenario is to connect communication system 108 with communication system 116 by connecting gateway 104 to gateway 106. Another scenario is to connect user device 114 to communication system 116 by connecting user device 114 to gateway 106. In some embodiments, user device 112 communicates using a different protocol than that used by user device 114. The connection information 136 contains the information required to establish scenario 134. The connection information for the scenario given in the previous example would include the IP address of the gateway 104 and the IP address of the user device 114.

The interoperability system is not limited to the configuration in the embodiment of FIG. 2. More generally, the interoperability system comprises an interoperability server and interoperability data as described with reference to FIG. 1.

In operation, the interoperability server receives a communication from a user device 112, 114, or 118 through the packet network 102, the communication containing a scenario identifier. The user device that sends the scenario identifier is referred to herein as the initiating user device. In some embodiments, the user device contains a menu of scenario identifiers that can be selected by an end user. In some embodiments, the scenario identifier is also accompanied with a password or PIN (Personal Identifier Number) identifying the user device or the user of the user device. In embodiments where a PIN or password is sent, the interoperability server will verify that the PIN or password is valid before proceeding. In response to receiving the scenario identifier, the interoperability server 120 accesses the interoperability database 130 and obtains the connection information corresponding to the scenario that corresponds to the scenario identifier sent by the user device. The interoperability server 120 then initiates the connection to establish the scenario corresponding to the scenario identifier sent by the user device 112, 114 or 118.

Gateways 104, 106 convert the protocol of the user devices 112, 118 into packet protocol and vice versa thus enabling user devices operating on different protocols to communicate with each other.

The interoperability system 100 enables the initiation of interoperable communication sessions from a user device without the requirement for an operator to set up a connection or patch. An initiating user device initiates the interoperable communication simply by sending a scenario identifier to the interoperability system, and the session is then automatically established.

The communication systems 108, 110, 116 can be any combination of radio systems, telephone networks such as a PSTN (Public Switched Telephone Network) or an IP (Internet Protocol) telephony network, IP radio systems, or public IP networks. In the case of IP based networks or systems, a gateway is not required. The communication systems may form part of a public safety network, including networks such as police, fire fighters and emergency services, as well as dispatch networks.

The user devices 112, 114, 118 are any user devices operable on the respective communication system. Examples of user devices include radio units, telephone units, IP radio units, IP telephony units, workstations and remote workstations.

In some embodiments the interoperability system can be accessed by a user device 112, 114, 118 to perform one or more of the following functions: activate a predefined connection; deactivate a predefined connection; define a connection, such as a radio patch; define a gateway; manage users; define schedules for one-time connections; and define schedules for recurring connections. An example of a user device that can be used to perform these functions is a workstation with access to the packet network. In another embodiment, a workstation is connected directly to the interoperability server. In some embodiments, the above functions can only be performed by a user with authorization. In such a situation, a password or PIN (Personal Identification Number) may be required in order to perform the above-identified functions.

Figure 3:
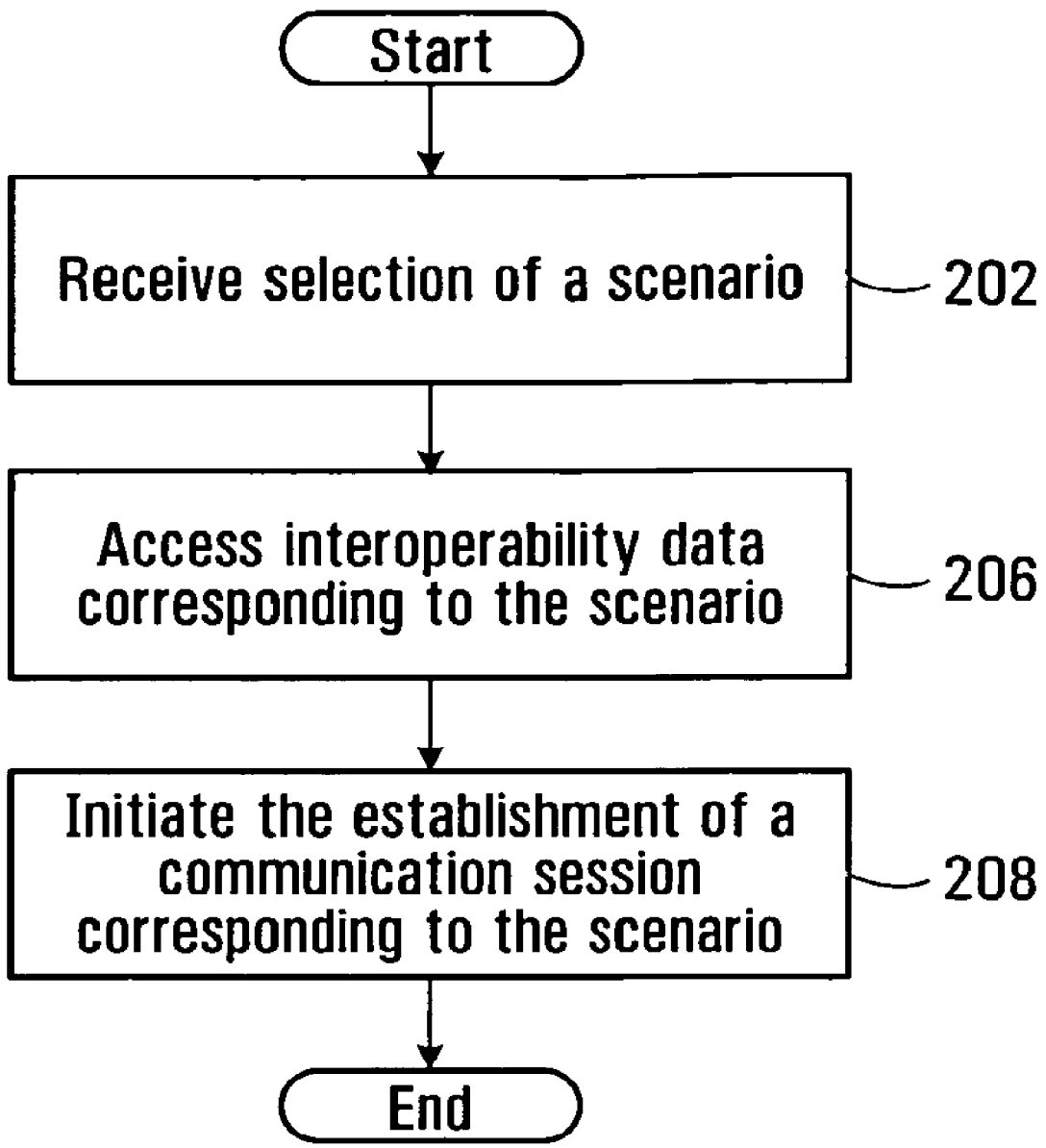
FIG. 3 is a flow chart of a method of establishing a communication session between two communication systems operating on different protocols according to one embodiment of the present invention.

FIG. 3 is a flow chart for a method for enabling interoperable communications between at least two communication systems using at least two different communication protocols, according to the present invention. At least one of the communication systems is a two-way radio system. In a preferred embodiment, the method is implemented on an interoperability server, such as the one described with reference to FIG. 2. In step 202 of the method, a selection of a scenario is received. In step 206, interoperability data corresponding to the scenario is accessed. Next, in step 208 the establishment of a communication session is initiated in accordance with the interoperability data corresponding to the scenario.

In the method described with reference to FIG. 3, the scenario identifier is the only information required to initiate the setting up of the communication session. Therefore, an end user at a user device can establish communication with a user device in another communication system having a different protocol simply by sending an identifier to the interoperability system.

For example, a user of a radio unit in a two-way radio system can enter a scenario identifier into his/her radio unit for a communication session with another radio system. The interoperability server receives the scenario identifier and initiates establishment of the communication session. Once the session is established user devices on both radio systems receive all signals broadcast in both systems on channels that they are monitoring.

In some multi-channel systems, the gateways have the capability to select an individual channel. For example, most radio control protocols include the ability to select which frequency is used by the radio. In some embodiments, the interoperability data accessed in Step 206 includes channel information, which the interoperability server can use to instruct the gateway as to what channel to use for incoming and outgoing communications. However, if there is only a single voice path between a given gateway and a respective radio system, the gateway/radio system combination is limited to one session at a time, regardless of how many channels are available in the radio system. In some embodiments, this limitation is overcome by deploying more than one voice path for a gateway. The number of voice paths dictates the number of simultaneous sessions in which a radio system can be involved.

In another example, a user of a radio unit in a radio system can enter a scenario identifier for an outside PSTN line. The interoperability server initiates establishment of a communication session between the radio system and the PSTN. The user is then prompted to enter a telephone number into the radio unit and a call to the respective telephone number is established. All radio units in the radio system are able to receive the call.

In some embodiments, the scenario identifier is sent using DTMF (Dual Tone Multi-Frequency) technology. In other embodiments, the scenario identifier is sent using IVR (Interactive Voice Response) technology. In still other embodiments, speech recognition technology is used.

In embodiments where IVR is used, a user keys in a code to access the IVR system or dials a number. The IVR system then prompts the user to provide a scenario identifier. In some embodiments the IVR will provide the user with possible scenarios and corresponding scenario identifiers.

In some embodiments, the method also comprises receiving a request to perform any of the functions listed above with reference to FIG. 2.

In some embodiments, the method also comprises receiving a PIN and verifying that the user device or user associated with the PIN has authorisation to initiate the requested communication session or to perform a requested function.

Figure 4:
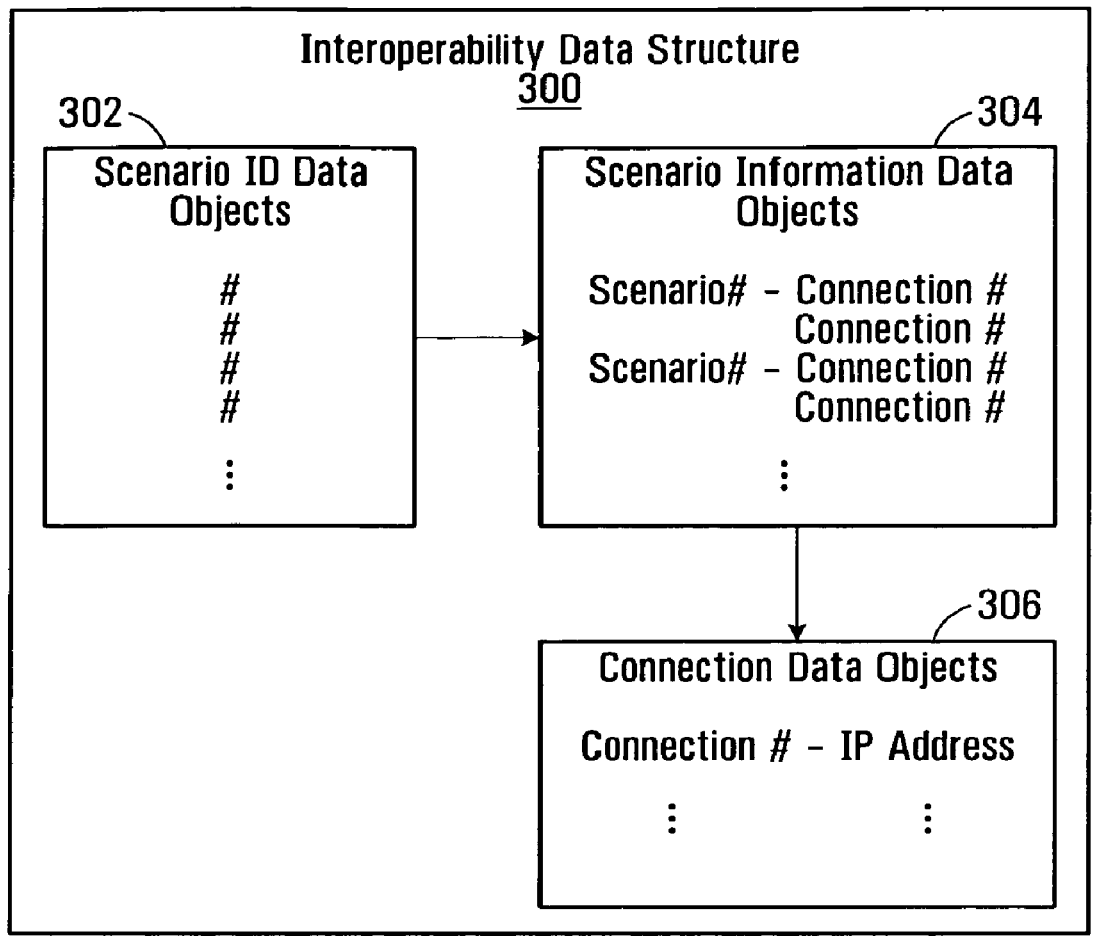
FIG. 4 is a block diagram of a data structure according to one embodiment of the present invention.

FIG. 4 is a block diagram of an interoperability data structure 300. The interoperability data structure 300 comprises scenario identifier data objects 302, scenario information data objects 304 and connection data objects 306. The scenario identifier data objects 302 point to scenario information data objects 304, which contain connections for each of a series of scenarios corresponding to the scenario identifier data objects. The scenario information data objects 304 point to the connection data objects 306 which contain data for each connection listed in the series of scenarios. Examples of the data for the connections include connection device type, such as a radio or telephone, and signalling protocol, such as EIA tone or digital protocol.

An example data structure according the embodiment of FIG. 4 is shown in Table 2:

TABLE 2

| Scenario Identifier | Scenario | Connection Data |
|---|---|---|
| 123 | Gateway A to Gateway B | IP address for Gateway A<br>IP address for Gateway B |
| 456 | Gateway B to Gateway C and Gateway D | IP address for Gateway B<br>IP address for Gateway C<br>IP address for Gateway D |

In Table 2 each scenario has an associated scenario identifier that is three digits and associated connection information. In order to establish the connections associated with any of the scenarios, a user need only enter the three digits of the corresponding scenario identifier into the initiating user device and send it to the interoperability server.

In some embodiments, the interoperability system is located on a distributed call management module (DCMM), such as that described in the Applicant's co-pending application Ser. No. 11/096,081.

Figure 5:
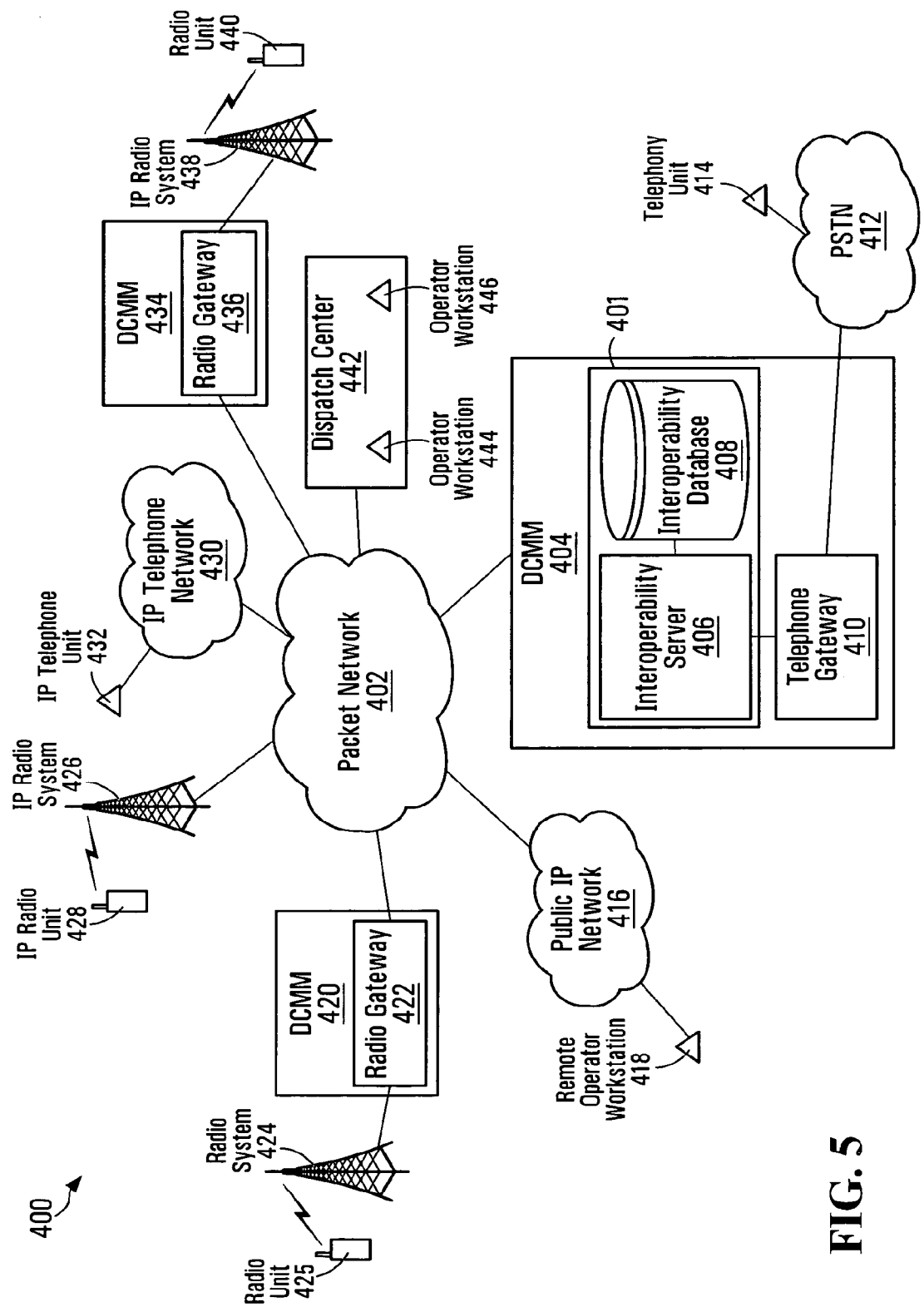
FIG. 5 is a block diagram of a communication network incorporating an embodiment of the present invention.

FIG. 5 depicts a communication network 400 in which an interoperability system 401, in accordance with one embodiment of the present invention, is located on a DCMM 404. The communication network 400 comprises a packet network 402 in communication with various communication systems. Each communication system has user devices. In the embodiment of FIG. 5, the communication systems are a PSTN 412, a public IP network 416, a radio system 424, an IP radio system 426, a packet based IP telephone network 430 and a radio system 438. Also in communication with the packet network 402 is a dispatch centre 442 having two operator workstations 444 and 446. An example of a dispatch centre 442 is a PSAP (Public Safety Answering Point). The user device in communication with the public IP network 416 is a remote operator workstation 418. The user device supported by the radio system 424 is a radio unit 425. Radio system 424 is in communication with the packet network 402 through a radio gateway 422, which is located on a DCMM 420. The user device for the IP radio system 426 is an IP radio unit 428. The user device for the IP telephone network 430 is an IP telephony unit 432. The user device for radio system 438 is a radio unit 440. Radio system 438 is in communication with the packet network 402 through radio gateway 436, which is located on DCMM 434. The user device for the PSTN 412 is a telephony unit 414. The PSTN 412 is in communication with the packet network 402 through telephone gateway 410, which is located on DCMM 404 along with the interoperability system 401.

In the embodiment depicted in FIG. 5, interoperability system 401 is located on DCMM 404. However, interoperability system 401 can be located on any DCMM such as DCMM 420 or 434 or on multiple DCMMs. Alternatively, the interoperability system 401 can be located on a separate server in communication with the packet network 402.

The interoperability system 401 comprises an interoperability server 406 and an interoperability database 408, which perform functions similar to the interoperability server 120 and the interoperability database 130 described with reference to FIG. 2.

As can be seen, the interoperability system can be implemented into a complex communication network. It will be appreciated that embodiments of the present invention are not limited to the number and types of communication systems in the embodiment of FIG. 5.

Examples of specific user devices initiating communication sessions will now be discussed with reference to FIG. 5.

For example, in an embodiment, the user of radio unit 425 has access to a menu of scenarios and associated scenario identifications. The scenario may be a communication session with any number of the other user devices or communication systems. To initiate any of the communication scenarios selected by the user, radio unit 425 sends a scenario identifier corresponding to the scenario to the interoperability system 401 using DTMF technology. The interoperability server 406 receives the scenario identifier. In some embodiments, the radio unit 425 also sends a PIN at the same time as the scenario identifier. In other embodiments, the interoperability server 406 prompts the radio unit 425 for the PIN. The interoperability server 406 verifies that the PIN is valid and then obtains the connection data from the interoperability database 408 to set up the communication session in accordance with the scenario. In some embodiments a radio unit can connect to another radio channel in real-time, connect to a telephone line in real-time, activate a predefined radio connection or patch, and/or deactivate a predefined radio connection or patch.

In another example embodiment, the user of telephone unit 414 has access to a menu of scenarios and associated scenario identifiers. The scenario may be a communication session with any number of the other user devices or communication systems. To initiate a communication session, telephone unit 414 sends a scenario identifier corresponding to the scenario to the interoperability system 401 using IVR technology. The interoperability server 406 receives the scenario identifier. In some embodiments, the telephone unit 414 also sends a PIN at the same time as the scenario identifier. In other embodiments the interoperability server 406 prompts the telephone unit 414 for the PIN. The interoperability server 406 verifies the PIN and then obtains the connection data from the interoperability database 408 to set up the communication session in accordance with the scenario. In some embodiments, a telephone unit can connect to a radio channel in real-time, activate a predefined radio connection or patch, and/or deactivate a predefined radio connection or patch.

A similar process is followed in order for any of the user devices to initiate a communication session.

In another embodiment, a user at a workstation 418, 444, or 446 can access the interoperability database after entering a password and perform any of the following functions: activate a predefined radio connection or patch; deactivate a predefined radio connection patch; define a radio connection or patch; define a gateway; manage users; define schedules for a one-time patch; and define schedules for recurring connections or patches. In some embodiments the user is presented with a user interface at the workstation which comprises a menu of the functions. In some embodiments the user interface also includes a menu of the scenarios available and the corresponding scenario identifiers.

What has been described is merely illustrative of the application of the principles of the invention. Other arrangements and methods can be implemented by those skilled in the art without departing from the spirit and scope of the present invention.

The invention claimed is:

1. A method of initiating communication between a plurality of communication systems, at least two of the communication systems using different communication protocols, the method comprising:
   maintaining interoperability data defining a plurality of scenarios, each scenario defining a mode of interoperability between a respective set of communication systems of the plurality of communication systems, at least one communication system in the respective set being a two-way radio system;

receiving a selection of a particular one of the scenarios and authorization information, wherein receiving a selection comprises receiving a scenario identifier from a device initiating the communication, the device configured to access one of the communication systems;

in response to receiving the selection and the authorization information, validating the authorization information and automatically initiating establishment of a communication session between the communication systems of the respective set of communication systems of the particular one of the scenarios; and receiving a request to perform a task utilizing the communication session, wherein maintaining interoperability data comprises maintaining a database including the scenarios, connection information related to the scenarios and scenario identifiers, and data indicative of routing data packets between the communications systems, each scenario identifier identifying one of the scenarios, wherein each of the plurality of communication systems is selected from the group consisting of a radio system, a dispatch system, a PSTN, a public IP (Internet Protocol) network, an IP telephone network, an IP radio system and any combination thereof.

2. The method of claim 1, wherein at least one scenario comprises communication with at least one gateway, the gateway enabling a respective communication system to communicate over a packet network and configured to convert signals received from a packet network into a protocol of a respective communication system and converting signals to be transmitted from the communication system into a packet protocol.

3. The method of claim 1, wherein at least one scenario comprises communication with at least one user device selected from the group consisting of a telephone unit, a radio unit, an IP (Internet Protocol) radio unit, an IP telephone unit and a workstation.

4. The method of claim 1, wherein the authorization information comprises a PIN (Personal Identification Number).

5. The method of claim 1, wherein the selection is received over a packet network.

6. The method of claim 1, further comprising receiving a request to perform a function selected from the group comprising: activating a predefined connection, deactivating a predefined connection, defining a connection, defining a gateway, managing users, defining schedules for one-time connections and defining schedules for recurring connections.

7. The method of claim 1, wherein the scenario identifier is sent by a user device in the communication system.

8. The method of claim 1, wherein maintaining interoperability data comprises maintaining a database comprising the scenarios, connection information related to the scenarios and scenario identifiers, each scenario identifier identifying one of the scenarios.

9. An interoperability system for enabling interoperability between a plurality of communication systems having at least two different communication protocols and said communication systems in communication with a packet network, the interoperability system comprising:

an interoperability server in communication with the packet network, the interoperability server configured to:

maintain interoperability data defining a plurality of scenarios, each scenario defining a mode of interoperability between a respective set of communication systems of the plurality of communication systems, at least one communication system in the respective set being a two-way radio system;

receive authorization information and a selection of a particular scenario, wherein the selection comprises a scenario identifier received from a device initiating a communication, the device configured to access one of the communication systems; and in response to receiving the selection and the authorization information, validate the authorization information and automatically initiate establishment of a communication session corresponding to the particular scenario for the device, wherein interoperability data comprises a database including the scenarios, connection information related to the scenarios and scenario identifiers, and data indicative of routing data packets between the communications systems, each scenario identifier identifying one of the scenarios, wherein each of the plurality of communication systems is selected from the group consisting of a radio system, a dispatch system, a PSTN, a public IP (Internet Protocol) network, an IP telephone network, an IP radio system and any combination thereof.

10. The interoperability system of claim 9, wherein the packet network is enabled for multicasting.

11. The interoperability system of claim 9, wherein the interoperability data is a database.

12. The interoperability system of claim 9, wherein the interoperability data comprises the scenarios, connection information for each scenario and a scenario identifier for each scenario.

13. The interoperability system of claim 9, wherein the interoperability server is located on a distributed call management module.

14. The interoperability system of claim 9, wherein the interoperability data is located on the interoperability server.

15. The interoperability system of claim 9, wherein any communication system that uses a protocol other than packet protocol is in communication with the packet network through a gateway that converts signals from the protocol of the communication system into packet protocol for sending over the packet network and converts signals from the packet protocol into the protocol of the communication system for sending over the communication system.

16. The interoperability system of claim 15, further comprising the gateway(s).

17. A non-transitory computer readable memory for storing data for access by an application program being executed on an interoperability server, comprising:

an interoperability data structure stored in said memory, the data structure including information resident in a database used by said application program, the information accessible by a scenario identifier provided by a device initiating a communication, the interoperability data structure including:

a plurality of scenario identifier data objects comprising a scenario identifier for each of a plurality of scenarios, each scenario including connections required for a respective communication session between at least two user devices from at least two different communication systems, at least one of the two communication systems being a two-way radio system, and having at least two different communication protocols; and a plurality of scenario interconnection data objects, the scenario connection data objects comprising connection information for the respective communication session, including any combination of connections between a plurality of radio units, IP Network unites, IP radio units, telephone units, IP telephone units, and workstations;

code for receiving and validating authorization information from the device initiating the communication; and code for automatically initiating establishment of a communication session corresponding to the scenario identifier provided by the device initiating the communication, wherein each of the plurality of communication systems is selected from the group consisting of a radio system, a dispatch system, a PSTN, a public IP (Internet Protocol) network, an IP telephone network, an IP radio system and any combination thereof.

18. An interoperability system for enabling interoperability between a plurality of communication systems having at least two different communication protocols and said communication systems in communication with a packet network, the interoperability system comprising:

means for maintaining interoperability data defining a plurality of scenarios, each scenario defining a mode of interoperability between a respective set of communication systems of the plurality of communication systems, at least one communication system in the respective set being a two-way radio system;

means for communicating with the packet network;

means for receiving authorization information and a scenario identifier from a device initiating a communication, the device configured to access one of the communication systems; and means for, in response to receiving the authorization information and the scenario identifier, validating the authorization information and automatically initiating a communication session for the device, wherein interoperability data comprises a database including the scenarios, connection information related to the scenarios and scenario identifiers, and data indicative of routing data packets between the communications systems, each scenario identifier identifying one of the scenarios, wherein each of the plurality of communication systems is selected from the group consisting of a radio system, a dispatch system, a PSTN, a public IP (Internet Protocol) network, an IP telephone network, an IP radio system and any combination thereof.

* * * * *

UNITED STATES PATENT AND TRADEMARK OFFICE
CERTIFICATE OF CORRECTION

| | | |
|---|---|---|
| PATENT NO. | : 8,346,263 B2 | Page 1 of 1 |
| APPLICATION NO. | : 12/719654 | |
| DATED | : January 1, 2013 | |
| INVENTOR(S) | : Olivier et al. | |

It is certified that error appears in the above-identified patent and that said Letters Patent is hereby corrected as shown below:

In the Claims

In column 13 at line 5 (approx.), In Claim 17, change "unites," to --units,--.

Signed and Sealed this
Twelfth Day of November, 2013

Teresa Stanek Rea
*Deputy Director of the United States Patent and Trademark Office*